United States Patent [19]

Schmid

[11] 3,975,276

[45] Aug. 17, 1976

[54] MODULAR AERATOR AND SEPARATOR ASSEMBLY FOR SEWAGE TREATMENT FACILITY

[76] Inventor: Lawrence A. Schmid, 2804 Brad Lane, Manhattan, Kans. 66502

[22] Filed: Mar. 17, 1975

[21] Appl. No.: 559,130

[52] U.S. Cl. .............................. 210/207; 210/220; 210/521; 210/525
[51] Int. Cl.² .................... B01D 43/00; C02C 1/12
[58] Field of Search .............. 210/195 M, 207, 220, 210/521–523, 525

[56] References Cited
UNITED STATES PATENTS

| | | | |
|---|---|---|---|
| 2,458,163 | 1/1949 | Hays | 210/195 R X |
| 2,616,848 | 11/1952 | Griffith | 210/195 X |
| 2,980,934 | 4/1961 | Steindorf | 210/523 X |
| 3,482,694 | 12/1969 | Rice et al. | 210/522 X |
| 3,491,892 | 1/1970 | McCann | 210/521 |
| 3,640,387 | 2/1972 | Conley et al. | 210/521 X |
| 3,796,321 | 3/1974 | Kosonen | 210/521 X |
| 3,819,054 | 6/1974 | Long et al. | 210/195 M |
| 3,828,933 | 8/1974 | Hampton et al. | 210/195 M |

Primary Examiner—Charles N. Hart
Assistant Examiner—Robert H. Spitzer
Attorney, Agent, or Firm—Schmidt, Johnson, Hovey & Williams

[57] ABSTRACT

An efficient, modular, drop-in type aeration and separation assembly for use in relatively small sewage treatment facilities is disclosed which includes perforated aeration conduits or diffusers situated adjacent the sewage inlets of the apparatus for inducing an upwardly directed hydraulic suction or "pumping action" which serves to increase the turbulence and aeration of sludge and other solids entering and collected within the unit. The assembly preferably includes a multi-tube particulate removal unit which effectively removes entrained solids from sewage passing upwardly therethrough, in conjunction with an inverted V-shaped grease collector positioned below the multi-tube separator which also serves as an air diffuser to facilitate selective air cleaning of the latter. Air conduit means are provided for the selective delivery of compressed air beneath the grease collector for even diffusion thereof, and the conduit means also permits suction removal of grease or the like trapped within the collector so that the assembly can be easily cleaned without the necessity of shutting down the overall treatment facility for extended periods.

13 Claims, 4 Drawing Figures

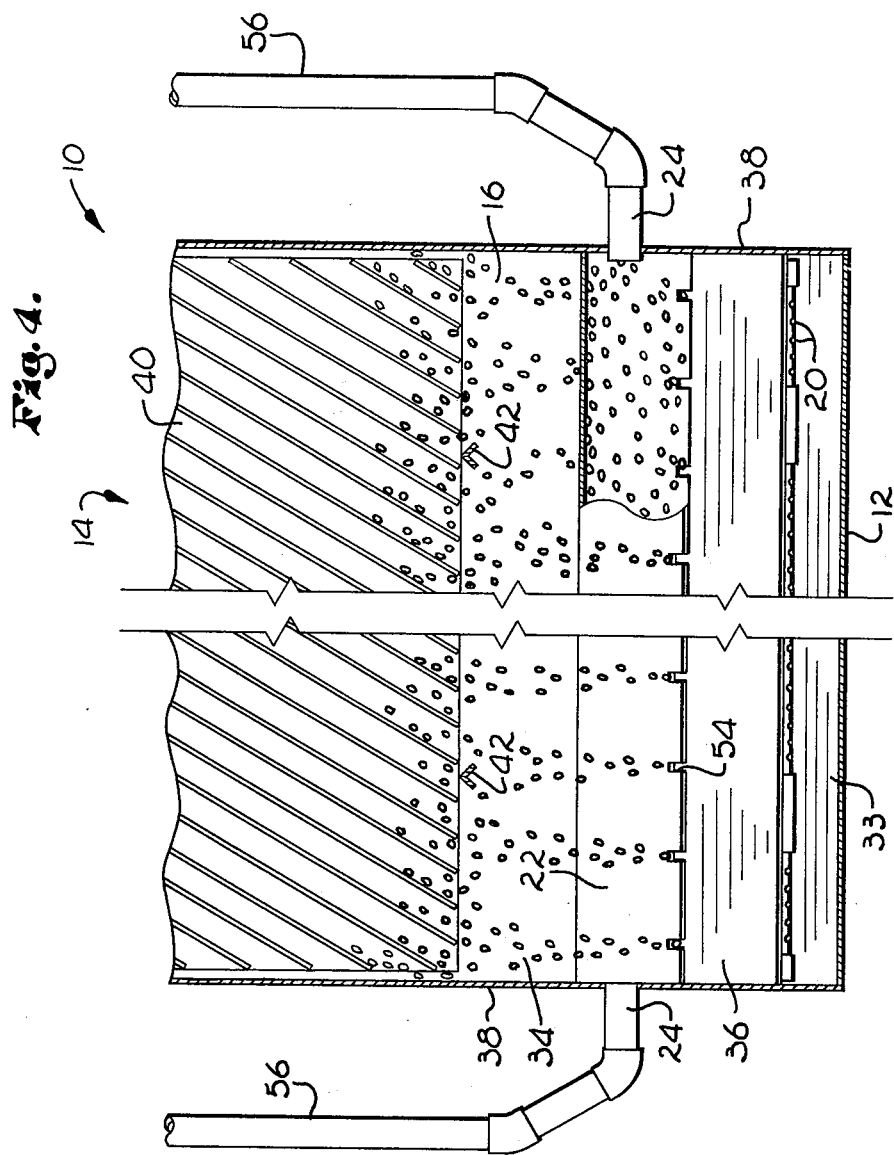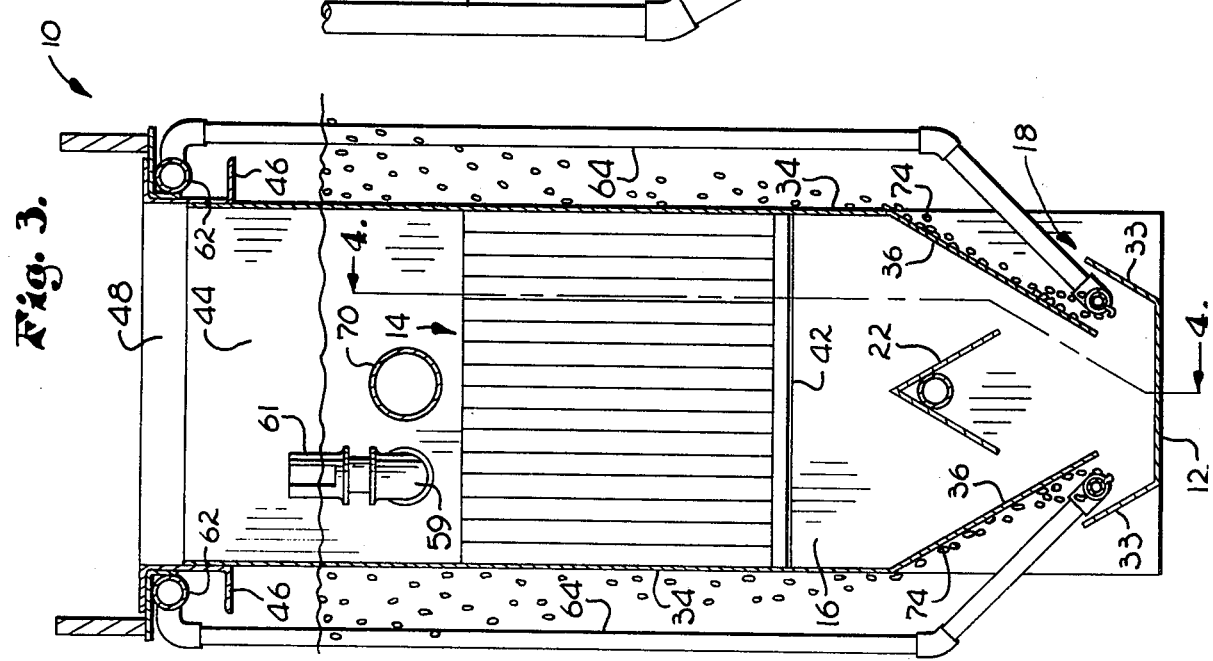

MODULAR AERATOR AND SEPARATOR ASSEMBLY FOR SEWAGE TREATMENT FACILITY

This invention relates to modular drop-in type aeration and separation units for use in relatively small sewage treatment plants of the type commonly found proximal to mobile home parks or the like. More particularly, it is concerned with such modular assemblies employing aeration diffusers situated adjacent the sewage inlets thereof in order to produce an upwardly directed, hydraulic suction for more efficiently treating sludge and other solid materials entering and collected within the assembly. Unique means are also provided for trapping grease and the like prior to particulate separation, with the grease collector also serving as an air diffuser to facilitate intermittent cleaning of the interior of the assembly.

In the past, it has been a common practice for municipalities or others to simply dump raw sewage into adjacent streams and waterways, rather than pretreating the sewage to remove organic and other pollutants therein. This practice was of course objectionable to those living downstream from the dumping site, and moreover presented serious health and ecological hazards. In extreme cases, the water could be rendered unfit for use without extensive purification thereof, thus necessitating the employment of relatively sophisticated water treatment facilities.

In recent years however, increasingly stringent governmental regulations have prohibited or drastically reduced the possibilities of lawfully disposing of raw sewage by simply dumping the same into the nearest river. In response to this, many communities have begun to treat sewage in a variety of ways to remove essentially all of the pollutants prior to return thereof to the waterways.

The problems alluded to above as especially significant in the case of developing housing communities or mobile home parks. These are generally built at unimproved sites not having sewage systems, near the outskirts of existing towns or cities. This difficulty has led to the refusal of building permits for such new housing communities solely on the basis of the cost of either expanding the existing metropolitan sewage system or of building a separate sewage treatment plant. Thus, otherwise desirable housing plans have been stalled because of the lack of adequate sewage treament.

In response to the foregoing, it has been suggested to construct and install relatively small sewage treatment plants adjacent new housing communities or mobile home parks. As can be appreciated, such plants are generally much smaller than those constructed to serve a large city, and in order to be feasible the construction and operation costs thereof must be held to a minimum. In this connection, there has been a notable lack of modular drop-in type aeration and separation assemblies for use in such small treatment facilities and accordingly such units have generally been constructed on-site, which is of course a costly and time-consuming proposition. Ideally, such a modular unit should be relatively light in weight, low in cost, and of a size to permit easy transportation and installation thereof in the field. In addition, the operational characteristics of such an assembly should be such that only a minimum of continuing service is required.

It is therefore the most important object of the present invention to provide a substantially self-cleaning, drop-in modular aeration and separation assembly especially adapted for use in relatively small sewage treatment plants and which is of a size and weight to facilitate easy transportation and installation thereof in the field and requires little or no continuing maintainence for the operation thereof.

Another object of the invention is to provide a modular drop-in type aeration and separation assembly employing aeration diffusers or conduits situated adjacent the lower sewage inlet openings thereof for inducing an upwardly directed hydraulic suction or "pumping action" on the sludge and particulate material entering and within the assembly so that the turbulence and consequent aeration thereof is maximized; the diffusers are preferably positioned behind generally upright baffles so that solids carried by the liquid sewage do not clog the diffuser air outlets.

Another object of the invention is to provide a modular assembly of the type described including a multi-channel particulate removal section situated within the assembly and operable to remove particulate matter from the sewage passing upwardly therethrough; in this connection, it is especially preferred to provide a separation unit including a plurality of elongated, obliquely disposed, side-by-side sewage-conveying tubes with the longitudinal axes of the tubes being disposed in opposite directions in alternating rows thereof, so that the impingement of entrained solids against the defining sidewalls of the separation unit is maximized.

Another object of the invention is to provide unique grease collector means situated beneath the particulate removal section in order to remove grease and the like prior to entrance thereof into the removal section so that the latter does not become clogged; in preferred forms, the grease collector is of inverted V-shaped configuration, and combination aeration and grease suction pipe assemblies are provided therewith for continuously withdrawing collected grease therefrom, and for selectively delivering volumes of compressed air into the confines of the collector so that the air is diffused by virtue of the configuration of the collector and is allowed to pass upwardly through the particulate removal section thereabove in order to clean the same.

In the drawings:

FIG. 3 is a vertical sectional view of the aeration and separation assembly illustrated in FIG. 1, and showing the internal construction thereof; and FIG. 4 is a vertical sectional view taken along lines 4—4 of FIG. 3 and further illustrating the internal construction of the overall assembly.

Figure 1:
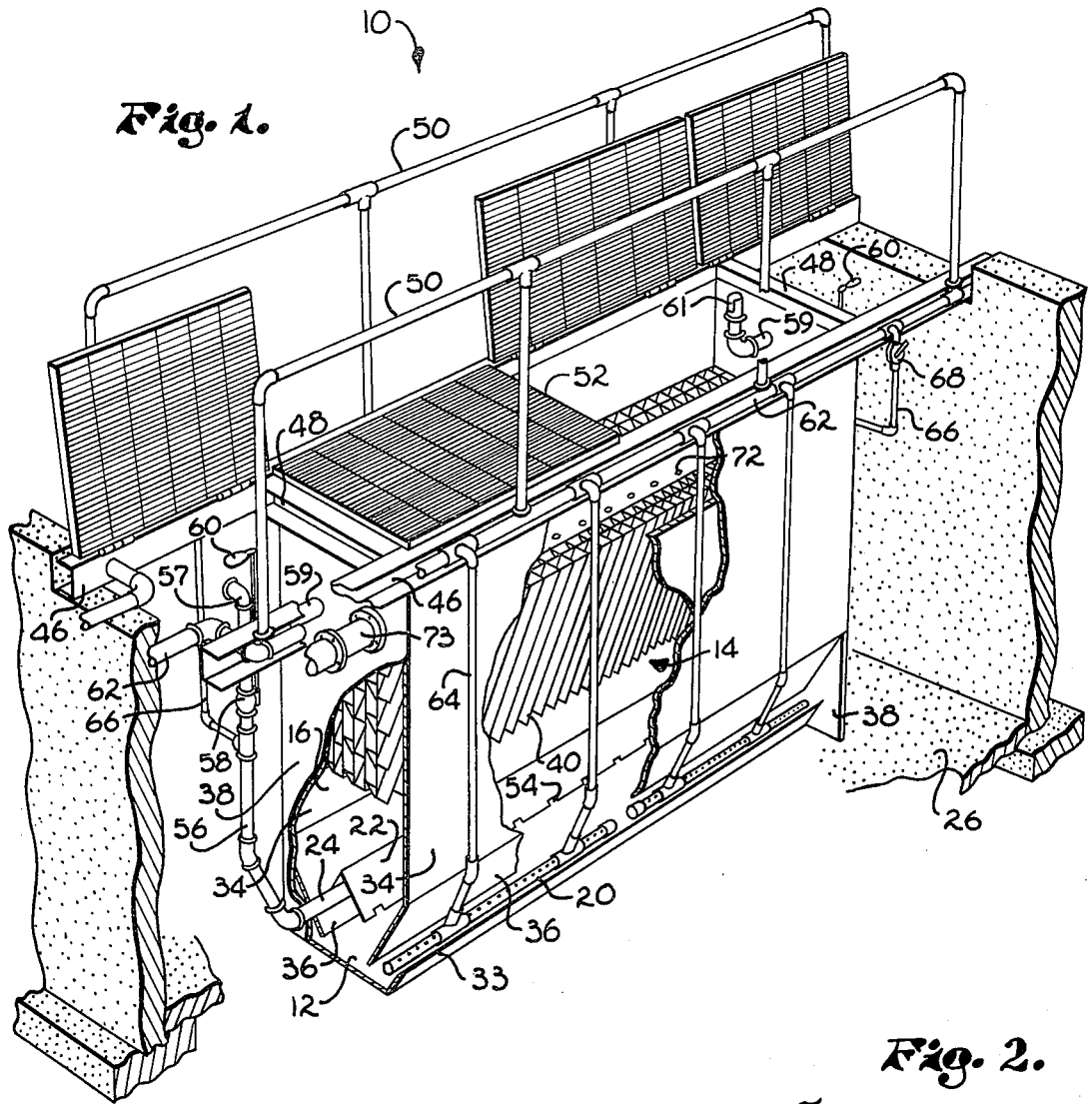
FIG. 1 is a perspective view of the drop-in modular aeration and separation assembly of the present invention, shown operatively installed in the receiving basin of the sewage treatment facility.

Sewage treatment apparatus 10 in accordance with the invention is shown in FIG. 1 and broadly includes a bottom wall 12 adapted to hold sludge and particulate matter derived from sewage to be treated. A particulate removal section 14 is situated above bottom wall 12 and is closed by defining walls which present a generally upright, open-top chamber 16 for directing liquid sewage upwardly through apparatus 10. The latter also includes a pair of elongated, opposed sewage inlet openings 18 situated adjacent the lowermost end thereof, with separate aeration means in the form of elongated, perforated air conduits or diffusers 20 positioned within the respective sewage inlet openings. Finally, the unit also includes a closed top, open bottom grease collector 22 of inverted, substantially V-shaped configuration for trapping grease and the like floating on top of the liquid sewage passing through apparatus 10. A pair of opposed pipe sections 24 extend beneath collector 22 on the respective ends thereof for purposes which will be made clear hereinafter.

Figure 2:
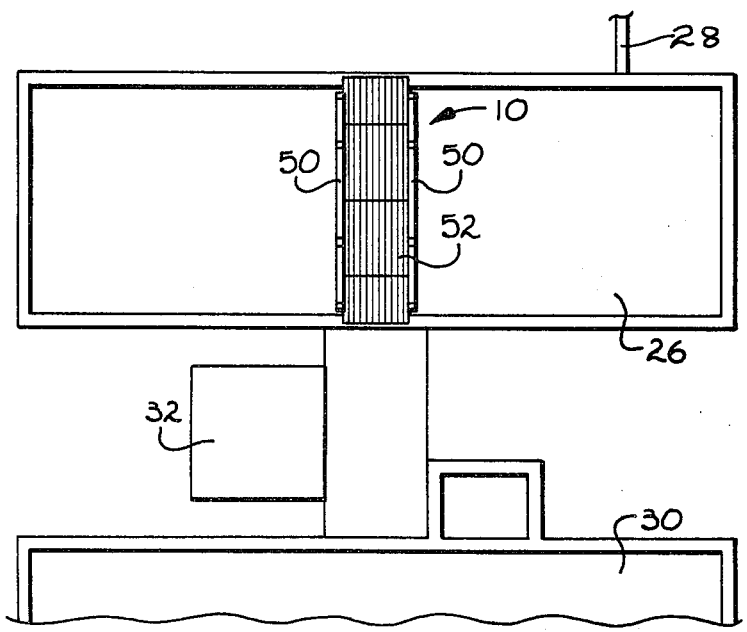
FIG. 2 is a fragmentary plan view of a typical sewage treatment facility employing the aeration and separation assembly hereof.

Although forming no part of the present invention, it is to be understood that apparatus 10 is adapted to be utilized to good advantage in a conventional waste treatment facility such as that shown fragmentarily in plan in FIG. 2. In particular, the facility includes an elongated receiving basin 26 adapted to receive raw sewage from an inlet conduit 28. Sewage passes through the inlet openings 18 of apparatus 10 and is transferred after treatment thereof to a large finishing basin 30 in order to complete the aeration and purification thereof. The purified water can then be returned to an adjacent river or stream in the well-known manner. The facility also includes a control house 32 for housing laboratory and chlorination equipment, as is conventional in these types of installations.

In more detail, bottom wall 12 of apparatus 10 includes a generally planar, horizontal section along with a pair of generally upright marginal baffle sections 33 extending upwardly therefrom. Chamber 16 thereabove is defined in part by a pair of spaced, opposed sidewalls 34 each having an angularly inwardly extending lowermost extension 36 which extends beneath the level of the adjacent upright baffle 33 and is spaced inwardly therefrom. In addition, chamber 16 is also defined by opposed, generally planar end walls 38. Thus, the opposed sewage inlet openings 18 of apparatus 10 are cooperatively defined by the respective upright baffles 33 the adjacent extensions 36 and the lowermost portions of end walls 38.

Particulate removal section 14 preferably comprises a multi-tube unit presenting a plurality of obliquely disposed, open-ended settling tubes 40. The tubes are advantageously arranged in rows with the longitudinal axes of the tubes being in opposite directions in alternating rows. The separation section 14 is of a size to extend between the side and end walls of chamber 16 so that sewage passing upwardly through apparatus 10 must pass through the separation unit for treatment therein. As best shown in FIG. 4, the multi-tube separation section 14 is supported within chamber 16 by means of a series of spaced, transversely extending support channels 42. It will also be seen that the defining walls of chamber 16 extend above the particulate removal section 14 and define a hollow, open-top space 44 for the reception of clarified water emerging from section 14 prior to transfer thereof to finishing basin 30 of the treatment facility.

An elongated support rail 46 is attached to the uppermost end of each chamber-defining sidewall 34 and extends beyond the respective end walls 38 thereof for the purpose of supporting apparatus 10 within receiving basin 26 of the sewage treatment facility. In addition, a cross brace member 48 is attached to the uppermost end of each end wall 38 for the purpose of rigidifying the overall apparatus. Rails 46 support upright railings 50 as well as a plurality of hingedly mounted grating sections 52 which present a continuous walkway over apparatus 10. Sections 52 can be selectively opened as shown to allow access to apparatus 10.

As explained, grease collector 22 is of inverted, substantially V-shaped configuration with the diverging sidewalls thereof opening downwardly towards bottom wall 12. In this connection, the lowermost marginal edges of the sidewalls are provided with a plurality of spaced air diffusion slots 54 along the length thereof which are important for purposes to be made clear hereinafter. Moreover, pipe sections 24 extend a short distance beneath the confines of collector 22 and are of a size to permit continuous suction withdrawal of grease or the like trapped within collector 22, or to selectively permit volumes of air to be delivered beneath the collector for cleaning of apparatus 10.

Separate, elongated, upright pipe assemblies 56 are connected to each section 24 and extend upwardly therefrom externally of apparatus 10 to a level above the top of particulate removal section 14 and terminate in an open-ended elbow 57. Each of the assemblies 56 includes a gate valve 58 therein which can be selectively operated by means of handles 60 (see FIG. 1) in order to control the operation thereof. In addition, separate skimmer conduits 59 extend through the respective end walls 38 of apparatus 10 and are interconnected outside the latter to the corresponding pipe assemblies 56 above the level of the valves 58 therein. Each conduit 59 includes an open-top skimmer attachment 61 at the end thereof within space 44. Separate compressed air conduits 66 are also interconnected between the respective assemblies 56 below the level of values 58 therein and one of the compressed air conduits 62 situated within the confines of the support rails 46. A manually operable valve 68 is interposed within each conduit 66 to control air flow therethrough.

Each elongated compressed air conduit 62 also includes a number of spaced, depending, communicating conduits 64 which are connected at the lowermost ends thereof to the generally horizontal, perforated aeration pipes or diffusers 20 situated within the inlet openings 18 of apparatus 10. The diffusers 20 are preferably positioned below the uppermost marginal edges of the adjacent baffles 33 so that rags or other solid wastes carried by the liquid sewage do not clog the diffusers. The respective conduits 62 are connected by means (not shown) to an air pump for delivering volumes of compressed air to the multi-orifice diffusers 20. Finally, a relatively large, elongated collection pipe 70 is positioned within space 44 above particulate removal section 14. Pipe 70 has a number of orifices 72 along the length thereof for the collection of clarified water emerging from the particulate removal section 14. In this respect, an imperforate conduit 73 is in operative communication with pipe 70 for withdrawing the clarified water under the influence of gravity and delivering the same to finishing basin 30 of the treatment facility.

In operation, sewage to be treated is directed to finishing basin 26 whereupon the sewage enters apparatus 10 through the opposed, lower inlets 18 thereof. At the same time, volumes of compressed air delivered through conduits 62, 64, and diffusers 20 create an upwardly directed stream of air bubbles which ensures that particulate matter and other solids entering apparatus 10 are freshly aerated. In addition, any sludge or particulate matter collected within the confines of bottom wall 12 is subjected to a hydraulic suction or "pumping action" which serves to agitate such matter to further aerate and more completely purify the sewage. This bubble flow and the consequent suction and aeration action of the compressed air is depicted by way of bubbles 74 leaving the separate diffusers 20 and traveling to the top of the liquid sewage. In addition, valves 68 and 58 within conduits 66 and assemblies 56 respectively are open during normal operation of apparatus 10 in order to create a suction action within pipes 24 and skimmer conduits 59, which is important for purposes to be made clear hereinafter. Such suction action arises by virtue of the flow of compressed air through conduits 66, the upper portions of assemblies 56, and ultimately out the external open-ended elbows 57.

The rising sewage next encounters grease collector 22 which is operable to skim grease and other materials floating on top of the liquid sewage prior to upward passage of the latter through particulate removal section 14. Specifically, grease floating on the sewage rising through apparatus 10 collects against the undersides of the diverging sidewalls of the V-shaped collector 22 and is trapped within the confines thereof. In this connection, the induced suction action within pipe sections 24 serves to continuously withdraw the collected grease from collector 22 for ejection thereof through elbows 57 externally of apparatus 10. In this fashion, essentially all of the objectionable grease or the like is removed from the sewage so that such material cannot clog the sewage conveying tubes of section 14.

The sewage next travels upwardly through chamber 16 for travel through the multi-tube particulate removal section 14. In this respect, the alternating, oblique orientation of the sewage-conveying settling tubes of section 14 ensures that any particulate matter entrained within the sewage impinges against the defining sidewalls of the section so that such particulate matter is separate from the liquid and is allowed to gravitate towards bottom wall 12 for collection and further agitation and aeration as described. A further explanation of the construction and operation of the preferred multi-tube particulate removal section 14 hereof is contained in U.S. Pat. Nos. 3,491,892 and 3,615,025.

After emerging from section 14, the substantially clarified and skimmed water within space 44 can be transferred by means of pipe 70 to finishing basin 30 for final purification. In this regard the fact that pipe 70 is submerged beneath the level of water within space 44 eliminates problems of ice formation and weir cleaning common to previous units of this type. Moreover, any remaining grease floating on top of the water in space 44 is skimmed off and delivered externally of apparatus 10 by means of the internal open-top skimmer attachments 61 and the negative pressure within conduits 59 attached thereto.

The present invention is also extremely advantageous by virtue of the self-cleaning features thereof. For example, collector 22 serves as an efficient air diffuser for facilitating the cleaning of apparatus 10 and especially section 14 thereof as desired. When it is desired to clean the sewage-conveying tubes of section 14, it is only necessary to manipulate handles 60 associated with gate valves 58 to temporarily close the latter and interrupt suction removal of grease from collector 22, whereupon compressed air from the conduits 66 flows downwardly in the separate upright pipe sections 56 for delivery beneath the collector 22. This action is depicted in FIG. 4 and illustrates that when volumes of air are thus directed within the confines of collector 22, the air is spread out and diffused by the configuration of the collector so that the rising bubbles of air can efficiently and effectively clean the multi-tube particulate removal section. In this respect, it will be seen that the spaced diffusion slots 54 along the marginal edges of the diverging sidewalls of collector 22 serve to even more evenly spread out and diffuse the air for cleaning of apparatus 10. In practice, it has been found that during normal usage of apparatus 10 it is only necessary to clean section 14 on a bi-weekly basis, and that the combination air delivery and greased removal assembly associated with collector 22 is especially advantageous for this cleaning.

It will thus be seen that the present invention provides a modular aeration and separation assembly which is characterized by its simple construction and efficient, essentially trouble-free operation. Moreover, means are also provided for easily and quickly cleaning the assembly without the necessity of shutting down the treatment facility for extended periods.

Having thus described the invention, what is claimed as new and desired to be secured by Letters Patent is:

1. Sewage treatment apparatus comprising:
 a bottom wall adapted to hold sludge and particulate matter derived from said sewage;
 particulate separation means situated above said bottom wall for removing particulate matter from sewage passing therethrough and permitting gravitation of said matter toward said bottom wall;
 generally upright chamber-defining means presenting a chamber for directing the flow of sewage through said separation means after entrance thereof into the apparatus,
 there being means defining a sewage inlet located below said particulate separation means whereby sewage entering the apparatus flows upwardly through said chamber and separation means;
 aeration means located outside of said chamber and adjacent said sewage inlet for inducing a generally upwardly directed hydraulic suction exteriorly of the chamber for increasing the turbulence and aeration of said sludge and particulate matter, and for aerating sewage entering said inlet;
 baffle means in at least partial covering relationship to said aeration means for preventing clogging of the latter by solid material within said sewage, said baffle means being in spaced relationship to said chamber-defining means with the aeration means disposed between the latter and the baffle means; and
 means located above said particular separation means for permitting withdrawal of clarified liquid emerging therefrom.

2. Sewage treatment apparatus as set forth in claim 1 wherein said baffle means is connected to said bottom wall and extends upwardly therefrom, said aeration means including an elongated, perforated conduit located between said baffle means and the adjacent portion of said chamber-defining means.

3. Sewage treatment apparatus as set forth in claim 16 wherein said bottom wall includes a pair of spaced, marginal, generally upright baffle sections, the latter and the sidewalls of said chamber-defining means cooperatively defining a pair of elongated inlet openings on opposite sides of said apparatus adjacent the bottom thereof, there being a separate, elongated, perforated aeration conduit situated within each of said inlet openings and between the baffle sections and sidewalls defining each of the latter.

4. Sewage treatment apparatus as set forth in claim 1, wherein said particulate separation means comprises a plurality of elongated, obliquely disposed, side-by-side sewage-conveying tubes.

5. Sewage treatment apparatus as set forth in claim 4, wherein said tubes are arranged in rows, the longitudinal axes of said tubes being disposed in opposite directions in alternating rows.

6. Sewage treatment apparatus as set forth in claim 1, wherein is included an elongated grease collector situated beneath said particulate separation means and located for removing at least a portion of any grease in said sewage prior to passage of the latter through said particulate separation means.

7. Sewage treatment apparatus as set forth in claim 6, wherein said grease collector comprises an elongated, closed top, downwardly opening, channel-like member.

8. Sewage treatment apparatus as set forth in claim 7, wherein said grease collector is of inverted, V-shaped cross section, there being combination aeration and grease removal means extending into the confines of said collector, said combination means being operable to deliver quantities of air for release within the confines of said collector for upward diffused travel of the air from said grease collector to clean said particulate separation means, and to permit suction removal of grease trapped by said collector.

9. Sewage treatment apparatus as set forth in claim 8, wherein the outer marginal edges of the diverging sidewalls of said collector are configured to present a series of spaced slots to facilitate upward diffusion of air released within the confines of said collector.

10. Sewage treatment apparatus comprising:
a bottom wall adapted to hold sludge and particulate matter derived from said sewage;
particulate separation means situated above said bottom wall for removing particulate matter from sludge passing through and permitting gravitation of said matter toward said bottom wall;
generally upright chamber-defining means presenting a chamber for directing the flow of sewage through said separation means after entrance thereof into the apparatus,
there being means defining a sewage inlet located below said particulate separation means whereby sewage entering the apparatus flows upwardly through said chamber and separation means;
combination air diffusion and grease collection structure situated below said particulate removal means and including a stationary, closed-top, downwardly opening, open-bottom, channel-like member configured for collecting grease from said sewage prior to entrance of the latter into said particulate removal means, the configuration of said channel-like member also serving to diffuse quantities of air released therebeneath;
combination grease removal and aeration means disposed at a level below said channel-like member for permitting selective and alternate suction removal of grease collected by said channel-like member, and release of volumes of air beneath the channel-like membber for diffusion of such air for cleaning said particulate separation means thereabove; and
means located above said particulate separation means for permitting withdrawal of clarified liquid emerging therefrom.

11. Sewage treatment apparatus as set forth in claim 10, wherein said member is of inverted V-shaped cross section, the outer marginal edges of the defining sidewalls thereof being configured to present a series of spaced slots to facilitate diffusion of said air.

12. Sewage treatment apparatus as set forth in claim 10, wherein said particulate separation means comprises a plurality of elongated, obliquely disposed, side-by-side sewage-conveying tubes.

13. Sewage treatment apparatus as set forth in claim 12, wherein said tubes are arranged in rows, the longitudinal axes of said tubes being positioned in opposite directions in alternating rows.

* * * * *